United States Patent [19]

Brausfeld et al.

[11] Patent Number: 4,627,597
[45] Date of Patent: Dec. 9, 1986

[54] VALVE ACTIVATION APPARATUS

[75] Inventors: Walter Brausfeld, Hanover; Helmut Göttling, Isernhagen; Rudolf Möller, Gehrden; Peter Müller, Hanover; Gerhard Scharnowski, Gehrden, all of Fed. Rep. of Germany

[73] Assignee: Wabco Westinghouse Steuerungstechnik GmbH & Co., Hanover, Fed. Rep. of Germany

[21] Appl. No.: 810,007

[22] Filed: Dec. 17, 1985

[30] Foreign Application Priority Data

Dec. 20, 1984 [DE] Fed. Rep. of Germany ....... 3446410

[51] Int. Cl.[4] .............................................. F16K 31/06
[52] U.S. Cl. ........................... 251/129.03; 251/129.15; 137/625.65
[58] Field of Search ...................... 251/129.03, 129.15; 137/625.65

[56] References Cited

U.S. PATENT DOCUMENTS

| | | | |
|---|---|---|---|
| 3,351,093 | 11/1967 | Frantz | 251/129.03 X |
| 4,207,917 | 6/1980 | Opel et al. | 251/129.03 X |
| 4,501,299 | 2/1985 | Klimowicz et al. | 251/129.03 X |
| 4,534,381 | 8/1985 | Hozumi et al. | 251/129.03 X |

Primary Examiner—Arnold Rosenthal
Attorney, Agent, or Firm—G. E. Hawranko

[57] ABSTRACT

This invention relates to an activation apparatus for valves, specifically electromagnetically-activated multi-way valves. The activation apparatus exhibits an activation element having a first stop and a second stop, which are arranged in facing-relation to one another, and to a housing projection formed by a graduated opening leading into the valve, so that a movement of the activation element, in the direction of its longitudinal axis, is limited or prevented. On the circumference of the activation element, there is a sealing element which is in sealed contact against the wall of the housing recess or graduated opening, which holds the activation element. The two stops and the sealing element are permanently connected with the activation element so as to form essentially a single-body construction. A valve moving arrangement, formed on the activation member and extending into the valve housing, is movable to an engaged position whereby, operation of the activation member effects manual operation of the valve under emergency or manual conditions.

13 Claims, 3 Drawing Figures

VALVE ACTIVATION APPARATUS

BACKGROUND OF THE INVENTION

This invention relates to an activation apparatus for valves, specifically electromagnetically-activated multiway valves.

Such activation devices are used specifically as manual operation devices for solenoid valves, so that in case of a failure of the drive medium for the valve element (power failure, defective coil or armature), the valve element can be placed in a position in which fluid pressure may still be introduced to the device being supplied through the electromagnetic valve.

An activation device of the type described above is known from the German Pat. No. DE 21 58 248. This device exhibits, in an open housing recess of a multiway solenoid valve, an indexing pin, which serves as the activation element, and which can be displaced in the direction of its longitudinal axis and can be rotated by a predetermined amount around its longitudinal axis. The indexing pin is provided with a bevelled groove, into which fits a guide pin, which limits the axial movement and the rotational movement of the indexing pin. The mounting for the guide pin is a hole in the housing transverse to the longitudinal axis of the housing recess. By means of gaskets, which are in grooves running in the circumferential direction of the indexing pin, and which are in sealed contact with the wall bordering the housing recess, the escape of pressure fluid through the gap between the wall of the housing recess and the jacket surface of the indexing pin is prevented. The indexing pin exhibits a bevel, by means of which, when the indexing pin is activated, the armature of the valve, designed as the valve element, is raised from the valve seat.

This known device exhibits several elements required for the guidance and mounting of the activation element in the housing recess, which means that the device entails a relatively high fabrication and installation expense.

There must be grooves worked into the activation element to hold the gaskets. The valve housing must be equipped with an additional hole for the guide and safety pin. When the device is being installed, the activation element must first be fitted with the gaskets, and then, avoiding damage to the gaskets, must be introduced and oriented in the housing recess. Finally, the guide and safety pin must be fitted into the hole in the valve housing which serves as the mounting.

SUMMARY OF THE INVENTION

The object of the invention, therefore, is to provide a valve activation device which is manually operable to effect valve operation in the event of a failure of the drive medium, which is simple in design, and which can be installed without complicated measures.

It is a further object of the invention to provide such a valve activation device where the activation device, mounting element, and sealing element are constructed as one piece and can be installed in a single installation.

The device according to the invention has the specific advantage, as a result of the configuration of the activation element, the mounting element, and the sealing element as a one-piece component, that the work required for assembly and installation can be significantly reduced. The entire device can be manufactured as a simple plastic injection molding. During installation, it is only necessary to insert the activation element into the open housing recess of the valve, and to make the connection with the valve housing by means of increased pressure in the direction of the longitudinal axis of the activation element in the manner of a snap connection.

In place of plastic, metal can also be used as the material for the activation element. In such a case, the sealing element is provided with a sealing lip vulcanized onto the metal body. The mounting element, required to limit the axial movement of the activation element, can either be a piece volcanized onto the acitvation element, or it can consist of snap hooks which are permanently connected with the activation element.

Briefly, the invention consists of a solenoid valve having an armature normally operated by a coil winding. The armature has a valve body, formed at one end, which, when the coil is deenergized, rests on a valve seat, interrupting fluid flow between an inlet and outlet port. The valve activation device has an activation portion, which extends into the chamber in which the valve body resides. In one embodiment, the valve activation device is rotatable such that, a cam portion, eccentrically-disposed on the face of the activation portion, contacts the valve body, lifting it off the valve seat. Another embodiment of the invention has the activation portion in a frustra-conical shape, which engages a groove on the valve body, and which is activated by axial movement and disengaged by rotational movement. The valve activation device has a center recess, which fits within a reduced-diameter portion of a graduated opening, the recess portion interacting with the reduced-diameter portion to effect a snap-closing of the valve activation device with the valve housing.

DESCRIPTION OF THE DRAWINGS

The embodiments of the present invention are described in greater detail in the drawings.

DESCRIPTION AND OPERATION

Figure 1:
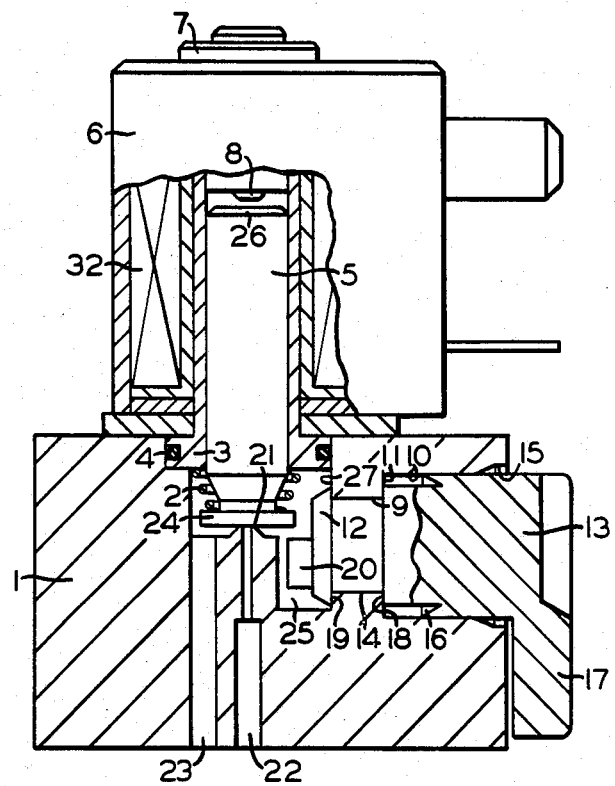
FIG. 1 is an elevational view, partly in section, of a solenoid valve with a one-piece manual activation apparatus, constructed in accordance with the invention.

The solenoid valve illustrated in FIG. 1 exhibits a valve housing 1, equipped with a fluid pressure inlet 22 and a fluid pressure outlet 23, as well as a magnet coil 32 located in a coil housing 6. The magnet coil 32 is pushed onto an armature guide tube 3, which is sealed against the valve housing 1, by means of a gasket 4. On a head piece located in the armature guide tube 3, which exhibits a fluid pressure outlet leading to the atmosphere, there is a milled nut 7. The milled nut 7 holds the magnet coil 32 and coil housing 6 onto the armature guide tube 3, and thus onto the valve housing 1. In the armature guide tube 3, there is an armature 5, which can move in the direction of its longitudinal axis. The armature 5 has, on its end facing the pressure inlet chamber 25, a valve body 24, which, together with an inlet valve seat 21 in the valve housing 1, forms an inlet valve 24, 21. On its end, away from the pressure inlet chamber 25, the armature 5 has an outlet valve body 26, which, together with an outlet valve seat 8 on the head piece, forms an outlet valve 26, 8. A spring 2, which is braced against a projection on the armature guide tube 3, pushes the valve body 24, connected with the armature 5, toward the inlet valve seat 21 and thus holds the inlet valve 21, 24 in the closed position when power to the coil is cut off. The valve housing 1 exhibits an open housing recess, designed as a graduated opening 9, 10, 11, running transverse to the longitudinal axis of the armature 5, which serves to hold an apparatus for the manual activation of the valve.

The activation device is designed as one piece and is essentially composed of an activation element, a first stop, a second stop, and a sealing element. The activation element 13 has a groove-like recess 14 running in the circumferential direction. The walls facing one another, which border the recess 14 in the direction of the longitudinal axis of the activation element 13, serve as the first stop 19 and the second stop 18. The distance between the two stops 19, 18 is defined so that it corresponds to the axial extension of the reduced graduation portion 9 of the graduated opening 9, 10, 11 which is narrowed as it enters the valve housing. The reduced graduation portion 9 projects into the groove-like recess 14 of the acitvation element 13, whereby the surfaces facing away from one another, of the reduced graduation portion 9 of the graduated opening 9, 10, 11 seen in the direction of the longitudinal axis of the graduated hole 9, 10, 11, serve as third and fourth stop surfaces 27, 11 of a stop firmly mounted on the housing for the two stops 18, 19 of the activation element 13. The surfaces 9, 10 of the graduated hole 9, 10, 11, running parallel to the longitudinal axis of the activation element 13, serve as a guide for the activation element 13. The first stop 19, located in the pressure inlet chamber 25, exhibits a frustra-conical peripheral region 12; which, when the activation element 13 is introduced into the graduated opening 9, 10, 11, is elastically-deformed and interacts with the reduced graduation portion 9 of the graduated opening 9, 10, 11 in the manner of a snap connection, whereby the first stop 19 of the activation element 13 comes into contact with the third stop surface 27, and the second stop surface 18 comes into contact with the fourth stop surface 11 of the reduced graduation portion 9 of the graduated hole 9, 10, 11.

A cam 20 is placed eccentrically on the end surface of the activation element 13 facing the pressure inlet chamber 25, by means of which, when there is a rotary movement of the activation element 13 around its longitudinal axis, the valve body 24 connected with the armature 5, can be lifted up from the inlet valve seat 21. The portion of the activation element 13, projecting out of the graduated opening 9, 10, 11, exhibits an articulated portion 17 which serves as a manual operation lever.

On the jacket surface of the portion of the graduated activation element 13 exhibiting the larger cross-section, there is a circular sealing lip 16, which is in sealed contact against the wall of the larger graduation portion 10 of the graduated opening 9, 10, 11. The sealing lip 16 has approximately the shape of a "V" and is oriented so that it is pressed by the fluid pressure in the pressure inlet chamber 25 against the wall of the larger graduation portion 10.

The operation of the apparatus described above is explained in greater detail below.

During the installation of the solenoid valve, the activation element 13 is introduced from the side of the graduated opening 9, 10, 11, exhibiting the larger diameter into the graduated opening 9, 10, 11. The frustra-conical peripheral region 12 of the activation element 13 is elastically-deformed when it reaches the reduced graduation portion 9, so that the activation element 13 with its groove-like recess 14, can be pushed into the reduced graduation portion 9 of the graduated opening 9, 10, 11, exhibiting the smaller diameter. As soon as the second stop 18 of the activation element 13 comes into contact with the fourth stop surface 11 of the reduced graduation portion 9, the elastic first stop 19 of the activation element 13 returns to its original shape. The activation element 13 is now connected with the valve housing 1 in the manner of a snap-connection. The introduction of the area of the activation element 13 with the sealing lip 16, into the graduated opening 9, 10, 11, is facilated by a funnel-shaped expansion 15 of the entrance of the graduated opening 9, 10, 11.

If the valve body 24, connected with the armature 5, is to be raised up from the inlet valve seat 21 when power to the magnetic coil 32 is cut off, then the activation element 13 is rotated around its longitudinal axis by means of the manual activation lever 17, until the cam 20 of the activation element 13 comes into contact with the valve body 24, pushes the latter, together with the armature 5, upward toward the outlet valve seat 8, and holds it in this position on account of the friction between the cam 20 and the valve body 24.

It is, of course, possible to provide stopping means on the activation element 13 and on the valve housing 1, which makes possible one or more intermediate positions of the activation element 13, and thus of the valve body 24 connected with the armature 5. The stopping means can consist, for example, of projections, which can be located in the manual activation lever 17 and interact with corresponding recesses in the wall of the valve housing 1, so that the integrity of the activation device remains guaranteed.

In place of the sealing lip 16 on the circumferential surface of the activation element 13, an annular sealing bead can also be provided on the side of the first stop 19, which faces the stop surface 27. As a result of the pressure in the pressure inlet chamber 25, with such an emobidiment and configuration of the sealing element on the activation element 13, the first stop 19 would be pressed with the sealing element against the stop surface.

With such a configuration of the sealing element, there is no need for a graduation, such as, the graduation 11, formed between the reduced graduation portion 9 and the larger graduation portion 10, to be formed in the open housing recess to hold the activation element. The manual activation element 17 or a stop, molded on the activation element outside the open housing recess, can serve as the second stop to limit or to prevent an axial movement of the activation element 13, which can be brought into contact with the outside of the valve housing. It is also possible to locate the sealing element 16 on the activation element 13 so that it takes over the function of the second stop.

The activation element, designed as a one-piece component, can be either be fabricated as a plastic injection molding or be fabricated of different materials. If the activation apparatus consists of different materials, then it is conceivable that the sealing element and the first stop, required for the snap connection, can be made of elastic materials, such as plastic or rubber, and these parts could be permanently connected with the activation element, which could be fabricated out of metal.

It is also conveivable that the area of the activation apparatus, exhibiting the first stop, can be slotted to achieve the elasticity required of this part for a snap-connection.

Figure 2:
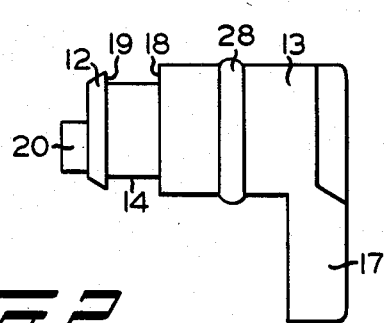
FIG. 2 is an elevational view of an activation element with a sealing element, designed as a circular bead.

As illustrated in FIG. 2, the sealing element can also be designed as a circular bead 28 on the circumference of the portion of the activation element 13 exhibiting the larger cross-section.

Figure 3:
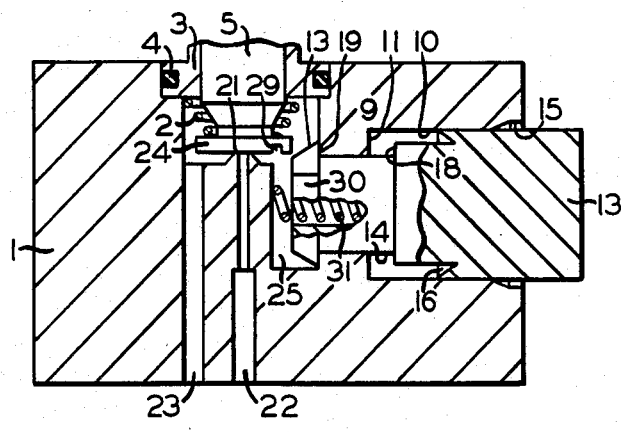
FIG. 3 is an elevational view, in section, of a solenoid valve with a manual activation device, constructed in accordance with an alternate embodiment of the invention.

FIG. 3 shows a cross-section of the portion of a solenoid valve equipped with the activation apparatus, whereby the activation element 13 can be moved in the direction of its longitudinal axis and can also be rotated around its longitudinal axis in an open housing recess.

For the sake of simplicity, the components which are identical to the components shown in FIG. 1, are identified by the same reference numbers.

FIG. 3 shows a cross section of a solenoid valve which exhibits a valve housing 1, connected with a pressure inlet 22 and a pressure outlet 23. A magnet coil (not shown) is pushed onto an armature guide tube 3, which is sealed against the valve housing 1 by means of a gasket 4, and is fastened to the valve housing 1. In the armature guide tube 3, there is an armature 5, which can be moved in the direction of its longitudinal axis. The armature 5 has, on its side facing the pressure inlet chamber 25, a valve body 24, which, together with an inlet valve 21 in the valve housing 1, forms an inlet valve 24, 21. A spring 2, which is braced against a projection of the armature guide tube 3, acts on the valve body 24, connected with the armature 5 in the direction of the inlet valve seat 21, and thus holds the inlet valve 21, 24 in the closed position when current is not fed to the coil.

The valve housing 1 exhibits an open housing recess, running transverse to the longitudinal axis of the armature and designed as a graduated opening 9, 10, 11, which serves to hold an apparatus for the manual activation of the valve.

The activation element exhibits a groove-like recess 14, running in the circumferential direction. The walls facing one another, bordering the recess 14 in the direction of the longitudinal axis of the activation element 13, serve as a first stop 19 and a second stop 18. The distance between the two stops 18, 19 is defined so that it is greater than the axial extension of the reduced graduation portion 9 of the graduated opening 9, 10, 11. The reduced graduation portion 9 extends into the groove-like recess 14 of the activation element 13, whereby the surfaces of the reduced graduation portion 9 of the graduated opening 9, 10, 11, opposite one another, seen in the direction of the longitudinal axis of the graduated opening 9, 10, 11, serve as third and fourth stop surfaces 27, 11 for the two stops 19, 18 of the activation element 13. The surfaces 9, 10 of the graduated hole 9, 10, 11, running parallel to the longitudinal axis of the activation element 13, serve as a guide for the activation element 13. The first stop 19 in the pressure inlet chamber 25 exhibits a concial peripheral region 12, which is elastically-deformed upon the introduction of the activation element 13 into the graduated opening 9, 10, 11, and interacts with the reduced graduation portion 9 of the graduated opening 9, 10, 11 in the manner of a snap-connection, whereby the first stop 19 of the activation element 13 can be brought into contact with the third stop surface 27, and the second stop 18 can be brought into contact with the fourth stop surface 11 of the reduced graduation portion 9 of the graduated opening 9, 10, 11.

On the end surface of the activation element 13, facing the pressure inlet chamber 25, there is a blind recess 33 to a spring 31, which is braced against a part of the valve housing 1 and thus holds the activation element 13, with its first stop, against the third stop surface 27 of the reduced graduation portion 9 of the graduated opening 9, 10, 11.

The valve body 24 exhibits, on its side facing the pressure inlet chamber 25, a slotted recess 29, in which the frustra-conical peripheral region 12 of the activation element 13 is engaged when there is a displacement of the activation element 13, toward the pressure inlet chamber 25, in the manner of a snap-closing. A recess 30, provided in the frustra-conical peripheral region 12 of the activation element 13, makes it possible to release the catch connection when there is a rotational movement of the activation element 13 around its longitudinal axis.

On the jacket surface of the portion of the activation element 13 exhibiting the larger cross-section, there is a circular sealing lip 16, which is in a sealed contact with the wall of the larger graduation portion 10 of the graduated opening 9, 10, 11. The sealing lip 16 has approximately the shape of a "V", and is oriented so that it is pressed by the fluid pressure in the pressure inlet chamber 25 against the wall of the larger graduation portion 10.

The operation of the apparatus described above is explained below. During the installation of the solenoid valve, the activation element 13 is introduced into the graduated opening 9, 10, 11 from the end having the larger diameter. The frustra-conical terminal peripheral region 12 of the activation element 13, which serves as a friction surface for the stop 19, 27 rigidly-mounted on the housing, is elastically-deformed when it reaches the reduced graduation portion 9, so that the activation element 13, with its groove-like recess 14, can be inserted into the reduced graduation portion 9 of the graduated opening 9, 10, 11, exhibiting the smaller diameter. As soon as the frustra-conical peripheral region 12, forming the first stop 19, is through the reduced graduation portion 9, the elastic peripheral region 12 resumes its original shape. The spring 31 pushes the activation element 13, with the first stop 19, against the stop surface 27 formed at the reduced graduated opening 9, 10, 11.

If the valve body 24, connected with the armature 5, is raised up from the inlet valve seat 21 when there is no power to the coil, then the activation element 13 is pushed against the force of the spring 31 in the direction of the pressure inlet chamber 25, until the valve body 24, connected with the armature 5, lifts up from the inlet valve seat 21, and the frustra-conical peripheral region 12 engages in the recess 29 of the valve body 24.

To be able to return the valve body 24, connected with the armature 5, to its initial position, the activation element 13 is rotated around its longitudinal axis until the recess 30 of the activation element 13, located in the frustra-conical peripheral region 12, reaches the region of the slot 29 located in the valve body, and the activation element 13 is pushed back into its initial position by means of the force of the spring 31.

It is also possible to design and configure the sealing element, located on the circumference of the activation element 13, so that it can be brought into contact against the fourth stop surface 11 of the reduced graduation portion 9 of the graduated opening 9, 10, 11 and thus takes over, on one hand, the function of the second stop 18 and, on the other hand, the function of the spring 31.

The first stop 19 and the second stop 18 of the activation element 13 can also be designed as individual projections of the activation element 13, running transverse to the longitudinal axis of the activation element 13. It is also conceivable that the stop rigidly-mounted on the housing need not be designed as a circular projection, but as a segmented projection.

We claim:

1. Activation apparatus for operating, under emergency and manual conditions, an electromagnetically-controlled multiway valve, having at least one inlet and one outlet port, and at least one valve arrangement disposed therebetween, and all formed in a valve housing, said activation apparatus comprising:
   (a) an activation member disposed in a housing recess formed in the valve housing, said activation member extending at least partially into a pressure chamber in which the at least one valve arrangement is disposed;
   (b) sealing means connected to said activation member for sealing said activation member against said housing recess;
   (c) holding means partially formed in said housing recess, and interacting with said activation member for holding said activation member in an engageable position with said housing recess, said holding means including first and second stop surfaces formed on said activation member, which interact with at least one complementary stop surface, formed in said housing recess, so as to limit movement of said activation member in the direction of the longitudinal axis of said housing recess;
   (d) at least one of said first and second stop surfaces formed on said activation member being elastically-deformable such that, upon introduction of said activation element into said housing recess, said activation member can be guided past said complementary stop surface and, once past said complementary stop surface, said elastically-deformable at least one stop surface can resume its original shape and interact with said complementary stop surface in the manner of a snap-connection;
   (e) said first and second stop surfaces and said sealing means being permanently affixed to said activation member to form essentially a single-piece component; and
   (f) valve moving means formed on a portion of said activation member, extending into said pressure chamber, for moving a valve body portion of the at least one valve arrangement when the electromagnetically-controlled multiway valve is operating under such emergency and manual conditions.

2. Activation apparatus, as set forth in claim 1, wherein said first and second stop surfaces are located on at least a portion of the circumference of said activation member at a predetermined axial distance from one another.

3. Activation apparatus, as set forth in claim 2, wherein said first and second stop surfaces are formed by the facing walls of a groove-like recess, formed in said activation member in a circumferentially-running direction.

4. Activation apparatus, as set forth in claim 3, wherein said first stop surface is elastically deformable, and exhibits a frustra-conical shape extending into said pressure chamber.

5. Activation apparatus, as set forth in claim 1, wherein said housing recess is constructed as a graduated opening, having a reduced-diameter portion formed in the valve housing adjacent said pressure chamber, and further, wherein said activation member exhibits a reduced-diameter recess portion substantially corresponding in diametrical dimension to said reduced-diameter portion of said graduated opening.

6. Activation apparatus, as set forth in claim 5, wherein said first stop surface is elastically-deformable and extends into said pressure chamber so as to interact with a rigid stop surface formed by a portion of said reduced-diameter portion of said graduated opening facing into said pressure chamber.

7. Activation apparatus, as set forth in claim 5, wherein said sealing means is a V-shaped seal, fixed around a circumferential portion of said activation member, which is of a larger diameter than said recess portion of said activation member, and which resides in a correspondingly larger diameter portion of said graduated opening.

8. Activation apparatus, as set forth in claim 5, wherein said sealing means is a circular sealing bead, fixed around a circumferential portion of said activation member, which is of a larger diameter than said recess portion of said activation member, and which resides in a correspondingly larger diameter portion of said graduated opening.

9. Activation apparatus, as set forth in claim 6, further comprising a second corresponding stop, formed by a portion of said reduced-diameter portion of said graduated opening, said second corresponding stop interacting with said second stop surface of said activation member in such a manner that said first and second corresponding stop surfaces face away from one another.

10. Activation apparatus, as set forth in claim 9, wherein said second stop surface of said activation member has a stop seal circumferentially disposed thereon, and said stop seal contacts said second corresponding stop surface to seal said pressure chamber from a larger diameter portion of said graduated opening.

11. Activation apparatus, as set forth in claim 1, wherein said valve moving means includes a cam portion, formed eccentrically on the face of said portion of said activation member extending into said pressure chamber, said cam portion contacting said valve body and moving said valve body to effect manual operation of the valve arrangement when said activation member is rotated.

12. Activation apparatus, as set forth in claim 1, wherein said valve moving means includes a tapered edge portion, formed on said portion of said activation member extending into said pressure chamber, said tapered edge portion moving said valve body until said tapered edge portion engages a groove formed in said valve body, thus effecting valve operation when said activation member is axially moved into said housing recess.

13. Activation apparatus, as set forth in claim 12, further comprising a flat portion formed on said tapered edge portion, said flat portion being effective, upon rotation of said activation member, to disengage said tapered edge portion from said groove, thereby disengaging such manual valve operation.

* * * * *